Oct. 15, 1940.  R. T. HOSKING  2,217,951

SELF-LOCKING SCREW

Filed July 29, 1938

RICHARD T. HOSKING
INVENTOR.

BY *George B. Willcox*
ATTORNEY

Patented Oct. 15, 1940

2,217,951

UNITED STATES PATENT OFFICE 2,217,951

SELF-LOCKING SCREW

Richard T. Hosking, Wilmette, Ill., assignor, by mesne assignments, to Illinois Tool Works, Chicago, Ill., a corporation of Illinois Application July 29, 1938, Serial No. 221,948

4 Claims. (Cl. 151—32)

This invention relates to locking devices for threaded rotatable members such as countersunk headed machine screws and the like.

A locking device of the general type referred to, embodied in a cone-headed screw, is shown in United States Patent No. 2,210,455, of August 6, 1940, which was filed on May 31, 1938. It comprises an endless circular ridge that surrounds the screw head and projects downwardly from its conical or tapered wall. The bottom edge of the ridge is sharpened throughout its length. Alongside the ridge and within the circle defined by it is an A-shaped groove or channel which also is endless.

The function of the downwardly projecting circular cutting edge is to penetrate the tapered wall of the countersunk hole in the work piece while the screw is being tightened. The ridge travels peripherally around and down, making a circular cleft or crevice in the tapered wall of the countersunk hole and throwing up therefrom an A-shaped wale. The wale starts as a small bur but soon fills the channel between the circular ridge and the main body of the head, where it becomes molded and wiped to the shape of the channel.

The locking function is imparted by shaping the closed apex portion of the channel so as to present a somewhat sinuous or non-circular path, although the wide portion of the channel remains circular. This non-circular apex portion of the channel in the screw head co-operates with the molded non-circular apex portion of the wale on the work piece to keep the screw from loosening under the conditions of use of such screws.

My present improvement carries forward the general principle involved in the device of the above mentioned copending application but here the locking result is attained in a different and somewhat simplified manner.

Objects of the invention are: structural simplification by arranging the cutting element so that it and the channel back of it can be formed on the tapered head of a screw by an ordinary heading machine operation. The cutter or the entire screw may be hardened afterwards to enable the device to be used on work pieces of steel or other hard tough metals. The self-locking screw thus produced differs only slightly in appearance from conventional taper-headed screws that possess no self-locking feature, and cost of manufacture is minimized.

More specifically this invention has to do with a new and useful arrangement, shape and structure of a wale-forming projection or lip and channel on the conical screw head, comprising novel means for automatically interlocking the work piece and the screw head during the later stages of tightening of the screw. A new mode of operation is also presented.

After a screw equipped with this device has been tightened down it may be taken out manually and thereafter can be applied and tightened repeatedly on the same work piece without disabling the wale.

The device here presented is characterized by having a lip whose cutting edge is short in the direction of its periphery, whereas the cutting edge described in the application above mentioned was endless.

In operation, during the downward rotational movement of the lip an upstanding wale is cleft from the work piece and forced into the channel. The conical wall portion of the screw head then comes into action, forcing all of the newly generated wale back into the space from which it came, except that small residual part of the peripheral length of the wale which is contained in the channel. This offset portion of the wale, enveloping the lip around its back and edges, functions as a traveling lock.

With the foregoing objects and advantages in view and certain others which will appear later in the specifications, my invention comprises the device described, claimed and illustrated in a preferred form, and the equivalents thereof.

Numeral 1 designates the conical head of a machine screw and 2 is its threaded shank received in a threaded hole 3 of the work, the hole being countersunk at 4 to match the screw head. The screw threads, being conventional, are omitted.

My improved self-locking device comprises a lip 5 that projects downwardly from the head 1 like the cutting lips of a wood-boring screw auger. The exterior wall of the lip is cylindrical. Preferably there are two such lips opposite each other to balance the stresses, or there may be three or more, if desired.

Figure 1:
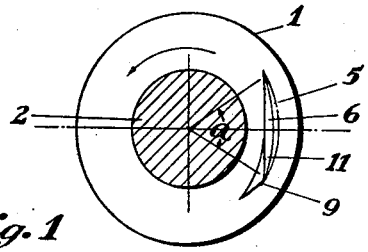
Fig. 1 is a view of the under side of the tapered head of a screw embodying my improvement.

The cutting edge of the lip is single beveled on the inside and has the form of a circular gouge chisel, deepest near the middle, being a style of edge called in the carpenter trade a "cow-mouth." The peripheral length of the lip may subtend an angle, $a$, Fig. 1, of about 45 to 60 degrees at the axis of the screw. The edges of the lip are appropriately shaped to penetrate the work piece while the lip describes a circle around the axis of the screw and simultaneously advances in the lengthwise direction of the screw. Back of each lip is a channel-like space 6 deepest and widest intermediate the ends of the lip and shallowest and narrowest at the ends.

As the screw is turned in the tightening direction the lip 5 advances toward the work and its deepest part 8 begins cutting a circular groove in the wall of countersink 4. Progressively the lip penetrates the work, throwing up an A-shaped wale which emerges peripherally from the trailing end 9 of the lip. While the wale is being formed it may be said to flow through the channel 6 back of lip 5, although actually the wale is stationary and the channel moves.

Figure 6:
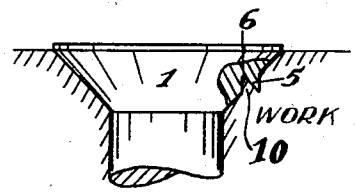
Fig. 6 shows the screw fully tightened down and locked.
Figure 4:
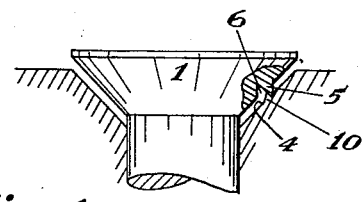
Fig. 4 is a part sectional diagrammatic view showing the first development of the wale in the channel.

The wale is small in the beginning, Fig. 4, but as the cut goes deeper into the work it enlarges until finally attaining the approximate size of channel 6, Fig. 6. The channel then molds and smooths the wale into its own cross-sectional shape.

At the open trailing edge 9 of the lip 5 where the wale emerges from the channel 6, the inner wall of the channel is faired as indicated at 11 so as to provide a wiping and guiding surface that assists in "ironing out" the wale just before the screw comes to its seat.

A similar faired area may also be provided at the advancing end of the channel if desired. An advantage of such fairing is that it enables the metal of the wale to flow more smoothly and easily into and out from the channel back of the lip and avoids tendency of the metal to pack into the channel behind the lip.

Figure 2:
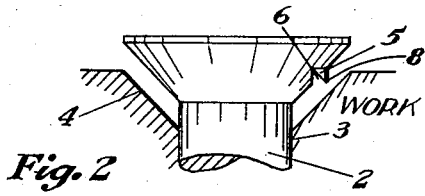
Fig. 2 is a part sectional side view of such a screw head as it appears when about to be screwed down into the countersink in a work piece.
Figure 7:
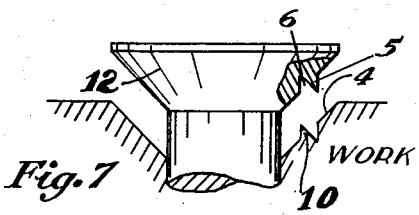
Fig. 7 shows the parts of Fig. 6 conceived to be separated for purposes of description.
Figure 3:
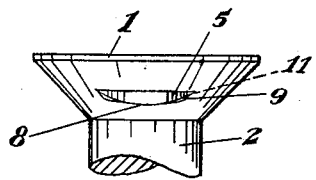
Fig. 3 is a side view of the head alone, as seen at right angles to the position in Figs. 1 and 2.
Figure 8:
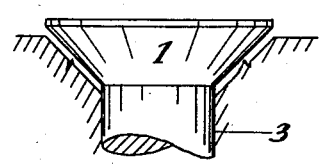
Figs. 8 and 9 are views showing the progressive steps in the operation of "ironing out" the wale by means of the conventional conical portions of the head where there is no cutting lip, such portions being shown also in Fig. 1.

In Figs. 1 and 2 lip 5 is shown with its outer wall vertical and its inner wall inclined upwardly to present the single-bevel or gouge chisel shape referred to. The outer wall of the lip is cylindrical and in Fig. 1 the inner wall is shaped approximately to conform with the cylindrical shape of the outer wall, just as the inner and outer walls of the cutting edge of a circular gouge chisel are formed.

However, it is to be understood that the inner wall of the lip 5 may be made flat, or it may even be made convex inwardly so as to throw the metal of the displaced wale further inward toward the axis of the screw and in this way produce an accentuated deformation of the wale and give an increased locking effect. The shape of the inner wall of the lip is made appropriate to the nature of the work and the use to which the screw is to be put.

Preferably, the lip 5 and channel 6 are proportioned relatively to the size of the screw head, to the angle of its cone, and to the pitch of the screw so that when the conical head 1 has seated itself fairly in the countersink 4 of the work the wale will have become large enough to nearly or quite fill the channel 6.

Figure 10:
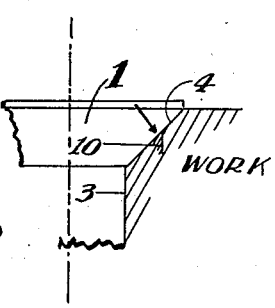
Fig. 10 is a fragmentary portion of the work piece showing the wale after having been restored to its original position.

When the head has become tightly seated the peripheral length of wale 10 will have been forced back into the place from which it came, having been "ironed out" by the smooth conical portion 12 of the screw head, as indicated by the arrow, Fig. 10, except the residual offset part of the wale which remains in the channel 6 behind each lip, see Fig. 6. The beveled back face and edges of the lip are enveloped by this part of the wale, as in a pocket. It keeps the screw from turning in reverse when subjected to vibrations in use.

Figure 9:
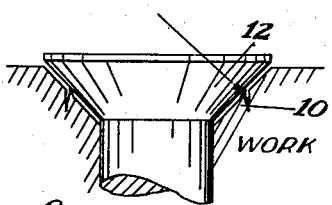
Figure 5:
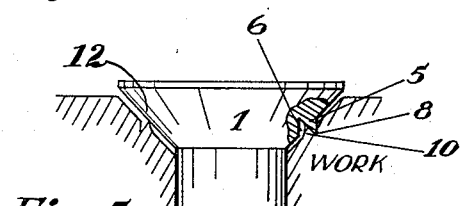
Fig. 5 shows the parts in a further stage of tightening.

The locking effect begins as soon as the smooth conical wall 12 of the screw head 1 commences to force the edge of the wale radially outward in the manner indicated by the arrow, Fig. 9, reaching its maximum when the head is tightly seated, as in Figs. 6 and 10.

This lip and channel produce a wale that is smooth surfaced and not weakened by checks, cracks, or crazing, because the wale passes into and flows through the channel 6 and passes out from the channel freely and naturally. The amount of metal deformation produced by the lip, the channel and the conical screw head is well within the elastic limits of the work, and the wale is therefore strong and durable for reuse with the same or similar screws.

When the screw is manually removed from the work by being turned in the loosening direction, the former trailing edge of the lip becomes an advancing edge traveling along the cleft, opening the wale, and causing it to pass freely through the channel 6 immediately after unscrewing commences.

Having thus described my invention, what I claim and desire to secure by Letters Patent is:

1. A conical screw head having a lip with a cylindrical exterior wall, said lip extending only part way peripherally around the head concentrically therewith and being provided with a cutting edge projecting downwardly from the conical head; said lip and head having between them a peripheral channel deepest intermediate the ends of the lip and shallowest adjacent said ends, the head adjacent the trailing edge of the lip having a faired surface that merges the wall of said channel into the conical surface of the head.

2. A conical screw head having a lip extending peripherally part way around the head concentrically therewith and being provided with a cutting edge projecting downwardly from the conical head; said lip and head defining between them a channel coextensive with the lip, being deepest intermediate the ends of the lip and shallowest adjacent said ends.

3. A conical screw head having an exteriorly cylindrical lip extending part way around the periphery of the head concentrically therewith, said lip being provided with a cutting edge that projects downwardly from the conical head; said lip and head defining between them a channel which is coextensive with the lip, being deepest intermediate the ends of the lip and shallowest adjacent said ends, the inner wall of said lip conforming approximately to the exterior cylindrical shape of the lip.

4. A conical screw head having on its tapered wall a wale-generating lip comprising an inner beveled wall, an exterior cylindrical wall coaxial with said conical head, a cutting edge along the lower margin of said lip projecting radially outward beyond the said tapered wall of the head, said edge being deepest near its middle portion extending circumferentially of said head and only part way around the same; said head and the inner beveled wall of the lip presenting between them a channel-like space deepest and widest intermediate the ends of the lip and shallowest and narrowest at its ends, said channel being open at the advancing and trailing ends of said cutting edge.

RICHARD T. HOSKING.